United States Patent [19]

Mergen

[11] 4,295,659
[45] Oct. 20, 1981

[54] STEERABLE SELF-SUPPORTING TRAILER

[75] Inventor: Joseph Mergen, Goshen, Ind.

[73] Assignee: Bangor Punta Corporation, Greenwich, Conn.

[21] Appl. No.: 94,526

[22] Filed: Nov. 15, 1979

[51] Int. Cl.$^3$ .............................................. B62D 13/00
[52] U.S. Cl. ................................ 280/405 R; 280/442; 280/446 B
[58] Field of Search .......... 280/405 R, 405 A, 423 A, 280/442, 446 B, 476 R, 62

[56] References Cited

U.S. PATENT DOCUMENTS

| | | | |
|---|---|---|---|
| 2,309,766 | 2/1943 | Harroun et al. | 280/405 R |
| 2,447,659 | 8/1948 | McDaniel | 280/476 R |
| 2,561,644 | 7/1951 | Averette | 280/442 |
| 2,639,159 | 5/1953 | Milligan et al. | 280/405 R |
| 3,105,704 | 10/1963 | Schramm | 280/405 R |

Primary Examiner—John A. Pekar
Attorney, Agent, or Firm—Patrick J. Walsh

[57] ABSTRACT

Disclosed is a self-supporting trailer having at least a pair of rear wheels and a steerable and casterable front wheel with the weight of the trailer being substantially equally divided among the wheels. The front wheel is carried for turning movement by a yoke which is secured to the trailer frame by leaf springs. The leaf springs provide rigid and lateral stability between the yoke and frame and enable vertical movement of the frame relative to the yoke. The steerable wheel is carried by a fork pivotally coupled to the yoke. A drawbar is bifurcated at its rearward end for connection to the yoke arms and pivotal movement about a horizontal axis. The opposite end of the drawbar carries a tongue mounting a hitch for connection to the towing vehicle and a steering arm carried by the fork whereby the steering wheel tracks the turning movement of the towing vehicle. The hitch connection with the towing vehicle and the horizontal pivotal axis of the drawbar and yoke define a plane and the pivotal connections at opposite ends of the steering link are maintained in this plane throughout the range of angularity of the drawbar resulting from any difference in elevation between the towing vehicle and the trailer. With the foregoing construction, vertical loading of the towing vehicle from the trailer is substantially minimized or eliminated and lateral stability is assured by the steering and casterable front wheel of the trailer.

18 Claims, 7 Drawing Figures

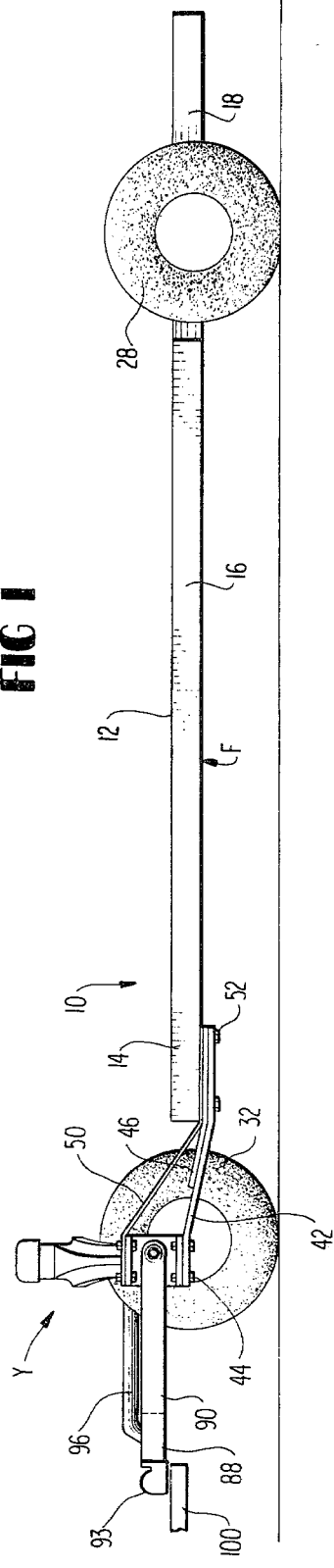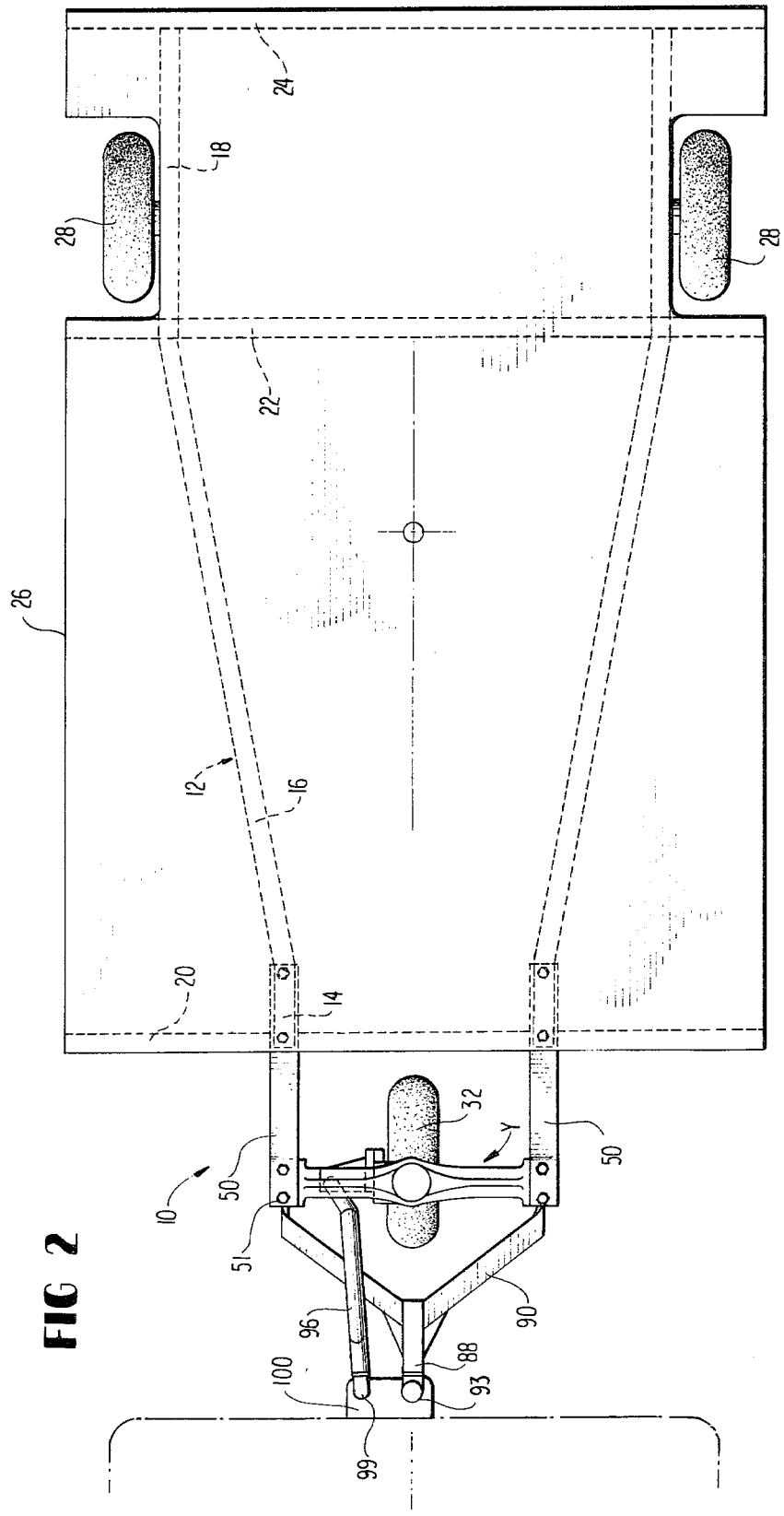

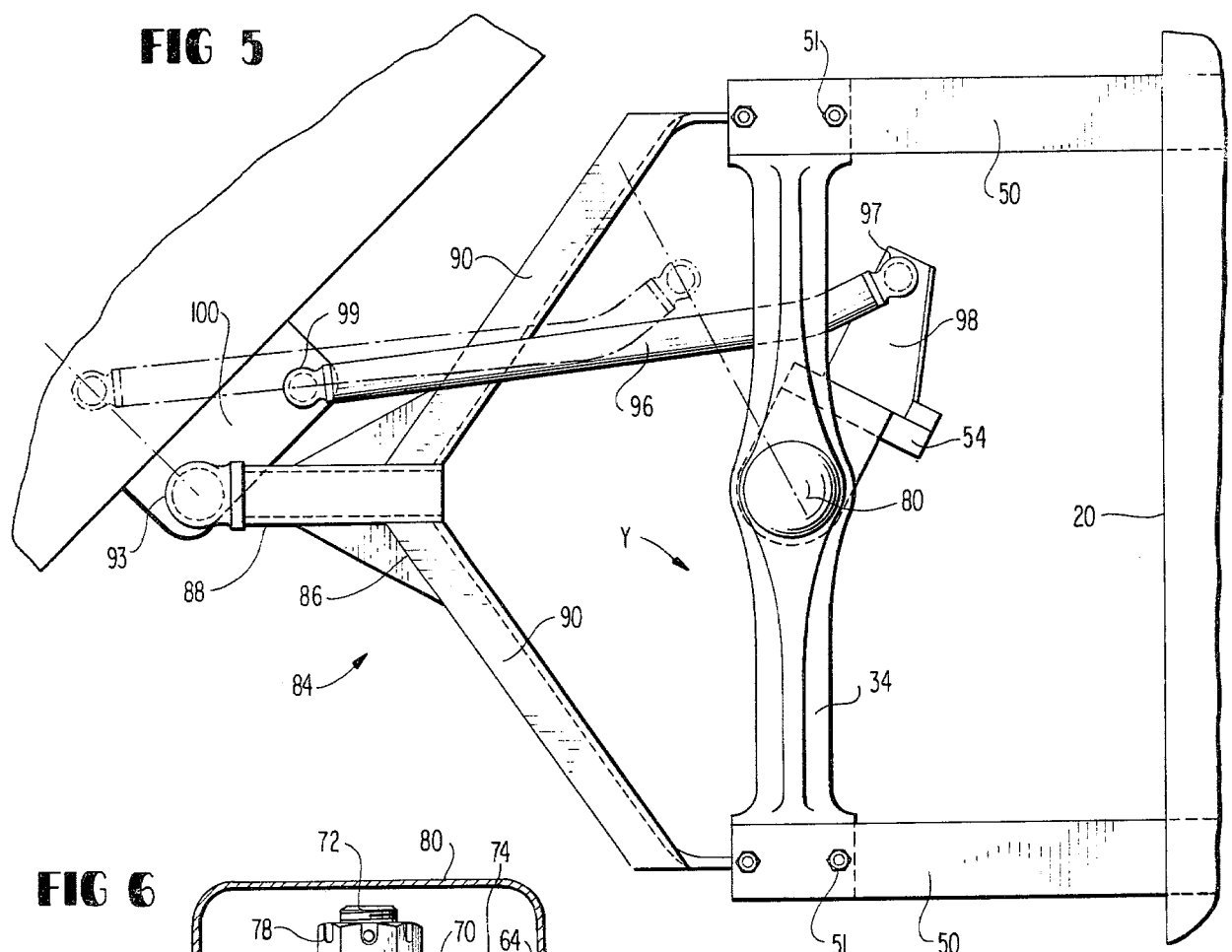
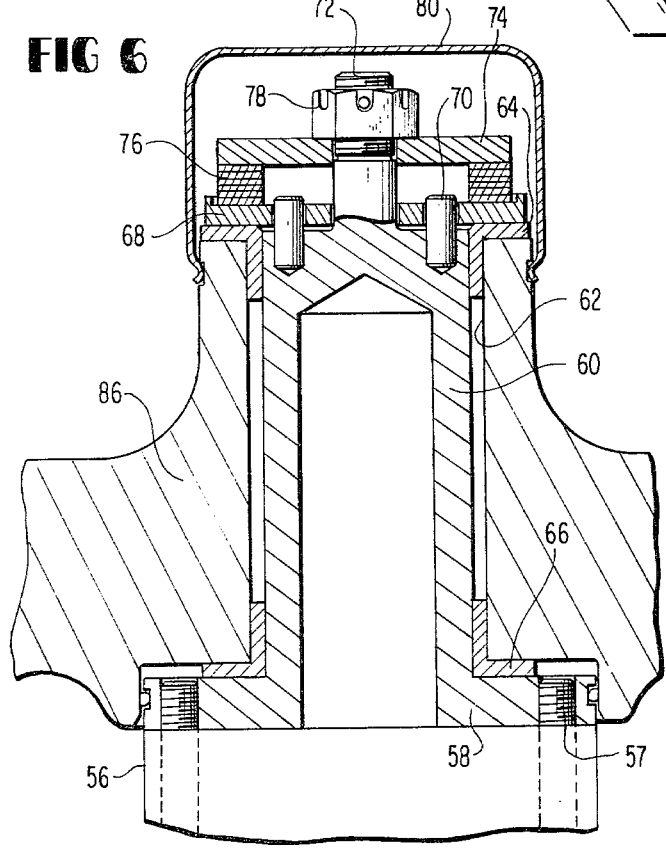
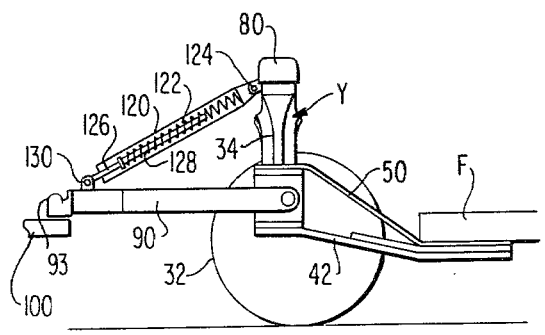

STEERABLE SELF-SUPPORTING TRAILER

BACKGROUND OF THE PRESENT INVENTION

The present invention relates to a self-supporting trailer for connection to a towing vehicle and particularly relates to a self-supporting steerable trailer system wherein transmission of vertical and lateral loadings from the trailer to the towing vehicle are substantially minimized or eliminated.

With the advent of lighter weight towing vehicles for transporting campers and recreational vehicles of all varieties, as well as commercial and industrial trailers, it has become necessary to consider reducing the forces, both lateral and vertical, on the towing vehicle at its hitch point, as well as the drawbar forces generated by towing the trailer, in the design of any new trailer system. For example, the transmission of varying vertical loadings from the trailer through the drawbar and trailer hitch to the towing vehicle may subject the towing vehicle to dangerous rocking or vertical motion sufficient to impair or prevent control of the towing vehicle and its towed trailer. This variable vertical hitch weight is particularly critical in the case of trailers or campers supported solely by wheels located substantially medially of their lengths. The hitch of this type of trailer or camper subjects the towing vehicle to substantial and variable vertical loadings caused essentially by a rocking motion about the trailer wheel supports. This potentially dangerous condition is exacerbated when such trailer is coupled to a lightweight towing vehicle. Also, lateral loads induced by centrifugal force under turn conditions, cross and quartering winds, and other forces tend to displace the trailer and the towing vehicle laterally and these pose control and consequent safety problems for the operator of the light weight towing vehicle.

Prior trailer systems have simply not addressed themselves to the problems inherent in utilizing lightweight towing vehicles and are therefore not particularly adaptable for use with the newer lightweight towing vehicles. For example, U.S. Pat. No. 2,561,644 issued July 24, 1951, discloses a dolly for supporting the forward end of a trailer in a manner which relieves the towing vehicle of the weight of the forward end of the trailer. Yet the structure disclosed in that patent transmits a vertical downward load of predetermined magnitude on the hitch of the towing vehicle. Consequently, vertical hitch loadings of varying magnitudes obtain and, as noted previously, have deleterious effects on the control and safety of the towing vehicle, particularly a lightweight towing vehicle. Further, this U.S. patent provides a steering arm connecting between the towing vehicle and the steerable dolly at the forward end of the trailer. However, variations in the hitch angle in this construction would apparently cause a change in steering direction of the dolly which would not be in accordance with the turning movement of the towing vehicle. The foregoing described and other prior trailering systems thus do not appear to be particularly useful in the design of a trailer system for use with lightweight towing vehicles where the reduction or elimination of the vertical and lateral forces acting on the hitch of the towing vehicle is advantageous and necessary.

SUMMARY OF THE PRESENT INVENTION

Accordingly, it is a primary object of the present invention to provide a novel and improved self-supporting trailer system particularly constructed for use with lightweight towing vehicles.

It is another object of the present invention to provide a novel and improved self-supporting trailer system which minimizes or eliminates vertical and lateral loadings on the hitch connection between the trailer and the towing vehicle.

It is still another object of the present invention to provide a novel and improved self-supporting trailer system having at least three wheels for bearing substantially equally the entirety of the weight of the trailer with the forward wheel being steerable for tracking the directional movement of the towing vehicle.

It is further object of the present invention to provide a novel and improved self-supporting trailer system having a front steerable wheel which, as a safety feature, is casterable in the event of failure in the steering assembly coupled between the front wheel and the towing vehicle.

It is still a further object of the present invention to provide a novel and improved self-supporting trailer system having a front steerable wheel wherein the steering assembly between the towing vehicle and the trailer is constructed to preclude change of the proper steering direction of the front wheel, as determined by the relative direction of travel of the towing vehicle and trailer respectively, due to variations of the hitch angle.

It is a related object of the present invention to provide a self-supporting trailer system wherein the entirety of the weight of the trailer is distributed substantially equally among its wheels, the front wheel of which is utilized to substantially minimize or eliminate the vertical hitch weight and steered to reduce the lateral loads induced by centrifugal force under turn conditions, cross and quartering winds, and any other force tending to displace the vehicle laterally.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, a self-supporting trailer constructed in accordance with the present invention comprises an elongated frame, at least a pair of wheels carried by the frame, a yoke connected to the frame at its forward end and having a pair of arms, a front wheel for bearing a portion of the weight of the trailer, means connecting the front wheel and the yoke one to the other for pivotal movement of the front wheel about a substantially vertical axis extending substantially medially between the outer ends of the yoke arms, a hitch assembly including a bifurcated drawbar having a tongue at its forward end for releasably coupling the trailer to the towing vehicle, and means for pivotally coupling each of the drawbar arms and a corresponding yoke arm one to the other for pivotal movement of the drawbar about a generally horizontal axis, and means for steering the front wheel in accordance with the turning movement of the towing vehicle including a steering link having pivotal connections at its opposite ends for pivotally connecting the front wheel and the steering link on the one hand and the steering link and the towing vehicle on the other hand. Thus, as a result of this construction, vertical and lateral loading on the hitch of the towing vehicle is substantially minimized or eliminated. Also, this construction improves the backing and maneuvering motions of the trailer in comparison with the corresponding motions of a conventional simple hitch trailer.

Preferably, the releasable coupling means includes a pivotal connection for coupling the tongue to the towing vehicle for pivotal movement about a generally horizontal axis, the pivotal connections carried by the tongue and the coupling means between the drawbar arms and the yoke arms defining a plane, the pivotal connections carried by the steering link constituting universal joints lying in the plane whereby the steering link connections are maintained in the plane throughout the range of relative pivotal movement between the hitch and the yoke. In this manner, the steering direction of the front wheel is independent of the angularity of the vertical hitch.

In another aspect of the present invention, the mounting means connecting the trailer to the yoke comprises leaf springs connected between the yoke and the frame. These leaf springs enable vertical movement of the frame relative to the yoke but prevent pivotal movement of the yoke about a vertical axis relative to the frame. Thus rigidity and stability in a lateral direction between the yoke and the frame is maintained.

In a further aspect of the present invention, a self-supporting trailer for coupling with a towing vehicle constructed in accordance with the present invention comprises an elongated frame, a pair of laterally spaced wheels carried by the frame adjacent a rear end thereof and a nose wheel carried by the frame adjacent its front end, each of the wheels being located about the frame to carry a substantially like portion of the weight of the trailer, a yoke, means connecting the nose wheel and the yoke one to the other for pivotal movement of the nose wheel about a substantially vertical axis relative to the yoke, means connecting the yoke and the frame one to the other enabling vertical movement of the frame relative to the yoke and preventing pivotal movement of the yoke about a vertical axis relative to the frame, and a hitch assembly for releasably coupling the trailer to the towing vehicle including a drawbar connected at one end to the yoke for pivotal movement about a generally horizontal axis, and coupling means adjacent the opposite end of the drawbar and forwardly of the frame for releasably coupling the trailer and the towing vehicle, whereby vertical loading of the towing vehicle from the trailer, when the trailer is coupled to the towing vehicle, is substantially minimized or eliminated.

The accompanying drawings which are incorporated in and constitute a part of this specification, illustrate two embodiments of the present invention, and, together with the description, serve to explain the principles of the present invention.

BRIEF DESCRIPTION OF THE DRAWINGS

FIG. 1 is a side elevational view of a self-supporting trailer system constructed in accordance with the present invention;

FIG. 2 is a top plan view thereof;

FIG. 5 is a fragmentary enlarged plan view of the forward end of the trailer hereof illustrating two positions of the steering assembly when tracking the turning movement of the towing vehicle;

FIG. 6 is a fragmentary enlarged cross-sectional view of the pivotal mounting of the front steerable wheel to the yoke and further illustrating the shimmy damper; and FIG. 7 is a fragmentary reduced side elevational view of the forward portion of a self-supporting trailer system illustrating a further feature of the present invention.

DETAILED DESCRIPTION OF THE PRESENT INVENTION

Figure 3:
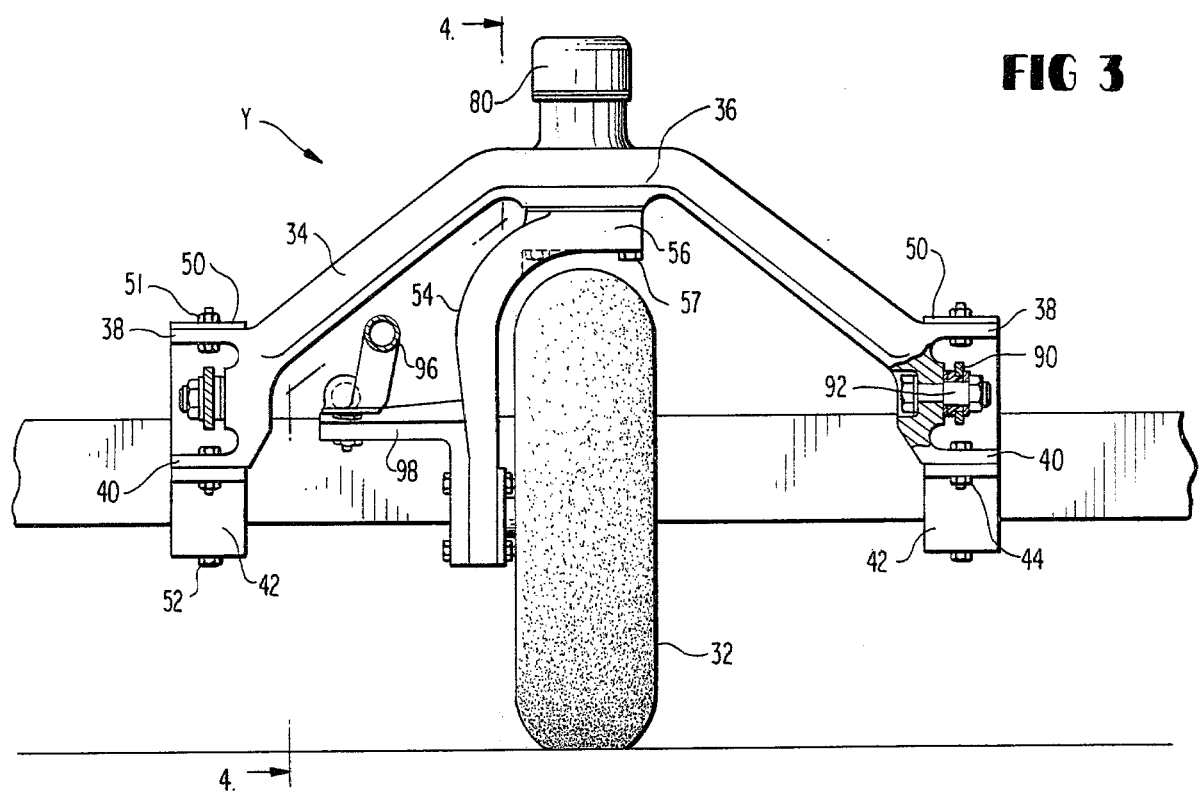
FIG. 3 is an enlarged cross-sectional view illustrating the yoke and front wheel of the self-supporting trailer system hereof and taken through the drawbar and steering link generally about on line 3—3 of FIG. 4.

Reference will now be made in detail to the construction of the two embodiments of the present invention, an example of a preferred embodiment being illustrated in FIGS. 1–6 of the accompanying drawings.

Referring now to the drawings, particularly to FIGS. 1 and 2, there is illustrated a preferred embodiment of a self-supporting trailer system constructed in accordance with the present invention and generally designated 10. Trailer system 10 includes an elongated frame F comprised of a pair of laterally spaced, longitudinally extending frame members 12, divided into forward, intermediate, and rear frame section 14, 16, and 18, respectively, and longitudinally spaced cross-frame members 20, 22 and 24 connected to the respective frame section 14, 16 and 18. As illustrated, the forward frame sections 14 are laterally spaced one from the other a distance less than the lateral spacing between aft frame sections 18. Also, the intermediate frame sections 16 angle laterally away from one another in a rearward direction and are suitably connected at opposite ends to the respective forward and rear frame sections. The frame members 12 are preferably formed of metal channels and interconnected to form a support frame for platform or floor 26. Floor 26 is preferably formed of an aluminum sheet underlying a foamed-in-place core which is covered by a chipboard or plywood top floor. Floor 26 is suitably secured to the frame members 12 by means, not shown. Suitable wood framing and other fittings, not shown, are secured to floor 26 and serve as attachment points for the body of the camper or trailer, also not shown.

Attached to the frame F along its laterally opposite sides by a suitable suspension, not shown, is a pair of rear wheels 28. A yoke, generally designated Y, is secured to the forward end of frame 12, in a manner to be described in detail, and mounts a front or nose wheel 32. Consequently, the illustrated trailer is provided with three road wheels for supporting its entire weight during travel. As illustrated in FIG. 2, the three wheels are located about the trailer to provide a center of gravity, e.g., approximately at the center of the trailer platform 26 with each of the wheels carrying a substantially like portion of the weight of the trailer. It will be appreciated that the present trailer is not limited to three wheel applications, and may embrace additional numbers of wheels, both trailing and front wheels. Thus, the three wheel system described and illustrated herein is exemplary only.

Turning now to FIG. 3, yoke Y has a pair of arms 34 which extend laterally and downwardly from a central portion 36 of yoke Y which constitutes the pivot housing for the front wheel 32 as described hereafter. Means are provided for connecting yoke Y and frame 12 one to the other to enable vertical movement of the frame relative to the yoke and preventing pivotal movement of the yoke about a vertical axis relative to the frame. This provides rigidity and stability for the yoke vis-a-vis the frame in a lateral direction. Particularly, each of arms 34 terminates in vertically spaced, laterally outwardly projecting, upper and lower flanges 38 and 40, respectively. Further, a pair of leaf springs 42 extend from the forward end of platform frame 12 and their forward ends are connected to the underside of lower flanges 40 by suitable fasteners, e.g. bolts 44. Rear portions of leaf springs 42 are reinforced by overlying leaf spring portions 46 which extend forwardly from frame 12 approximately half the length of springs 42. The connecting means between the yoke Y and frame 12 also include a leaf spring 50 on each side of the yoke. The forward ends of leaf springs 50 are suitably secured to upper flange 38; e.g., by bolts 51, while the rearward ends of leaf springs 50, together with the rear portions of leaf springs 42 and leaf spring portions 46, are suitably secured, e.g. by bolts 52 to the underside of frame sections 14. The leaf springs constitute the sole connection between frame 12 and yoke Y and, by providing spaced upper and lower springs, the yoke is rigid and stabilized in the fore and aft and torsional directions.

Means are provided for connecting the front wheel 32 and the yoke Y one to the other for pivotal movement of wheel 32 about a substantially vertical axis extending substantially medially between the ends of yoke arms 34. As illustrated, front wheel 32 is suitably mounted on bearings, not shown, in the lower and distal end of a fork 54 for rotation about a generally horizontal axis. Fork 54 depends from an integral mounting plate 56 which is secured, for example by bolts 57, to an annular flange 58 forming the lower end of a vertically upwardly directed stub shaft 60. This enables quick disassembly for shipping and use of different materials for the stub shaft and fork. The central portion or base 36 of yoke Y is provided with a through bore 62 and a counterbore 63 at its lower end for receiving flange 58 and an O-ring seal 59 thereabout. A pair of upper and lower thrust bearings 64 and 66 are carried by the yoke about the opposite ends of bore 62 for taking up radial and axial thrust loads. Thus, the weight of the forward portion of the trailer transmitted through leaf springs 42 and 50 as well as the weight of the yoke is carried by front wheel 32, wheel 32 being pivotal about the vertical axis of bore 62. It will be appreciated from a review of FIGS. 4 and 5, that the arm of fork 54 declines in a rearward direction from its base 56. In this manner, the horizontal axis of the front wheel 32 is located rearwardly of its turning or vertical axis. This rearward offset of wheel 32 from its vertical turning axis enables the wheel to caster and provides a "fail safe" condition upon failure of the steering assembly described in detail hereinafter.

Front wheel 32 is secured to yoke Y in a manner to damp oscillations, e.g. to damp any tendency of the wheel to shimmy in use under road conditions. Particularly, the shimmy damper, as best illustrated in FIG. 5, includes a plate 68 which is coupled to stub shaft 60 for rotation therewith by pins 70. Plate 68 is disposed directly on the upper radial and axial thrust bearings 64. Plate 68 is free to move in an axial direction about a reduced diameter shaft 72 which projects axially upwardly from the upper end of stub shaft 60. A plate or washer 74 is received about reduced shaft 72 and a plurality of wave or bellows type springs 76 are disposed between the plates 68 and 74. The upper end of reduced shaft 72 is threaded and a cotter keyed nut 78 is threaded about shaft 72 to retain the upper plate 74 about reduced shaft 72 against the bias of springs 76. With this construction, axial preloading of the bushings is provided by lower plate 68 and flange 58 of the stub shaft 60 under the bias of springs 76. This develops a two plate friction brake of sufficient capacity to damp out oscillations of conventional shimmying of the castering wheel 32. This construction, with proper applied torque, will also damp the system without excessive steering loads. The pivot housing and shimmy damper are covered by a cap 80 suitably secured to the central portion 36 of yoke Y.

A hitch assembly, generally indicated 84, couples the yoke Y and the hitch 84 to a towing vehicle whereby trailer 10 is towed behind the towing vehicle. Particularly, and as best illustrated in FIGS. 3 and 5, hitch assembly 84 includes a drawbar 86, carrying a forwardly extending tongue 88 and which drawbar is bifurcated to form a pair of legs 90 extending rearwardly from tongue 88. Legs 90 are secured at their rearward ends to yoke arms 34 between upper and lower flanges 38 and 40 for pivotal movement about a generally horizontal axis. Pins 92 are received in apertures formed in the ends of yoke arms 34 and the drawbar legs 90 are suitably secured thereto, for example by nuts threaded onto the opposite ends of pins 92, enabling the drawbar to pivot freely about the horizontal axis defined by pins 92. From a review of FIG. 1, it will be appreciated that the range of pivotal movement of drawbar 86 is limited by stops comprising the bolts 44 and 51 used to secure the leaf springs to the yoke. Preferably, the range of angular movement of the drawbar about pins 92 is plus or minus ten degrees from a median horizontal plan. This is to prevent unacceptable vertical loads should the trailer ride over a large bump or rut not affecting the towing vehicle and thus cause the trailer to overrun the towing vehicle and give an upward or downward force beyond acceptable limits.

Figure 4:
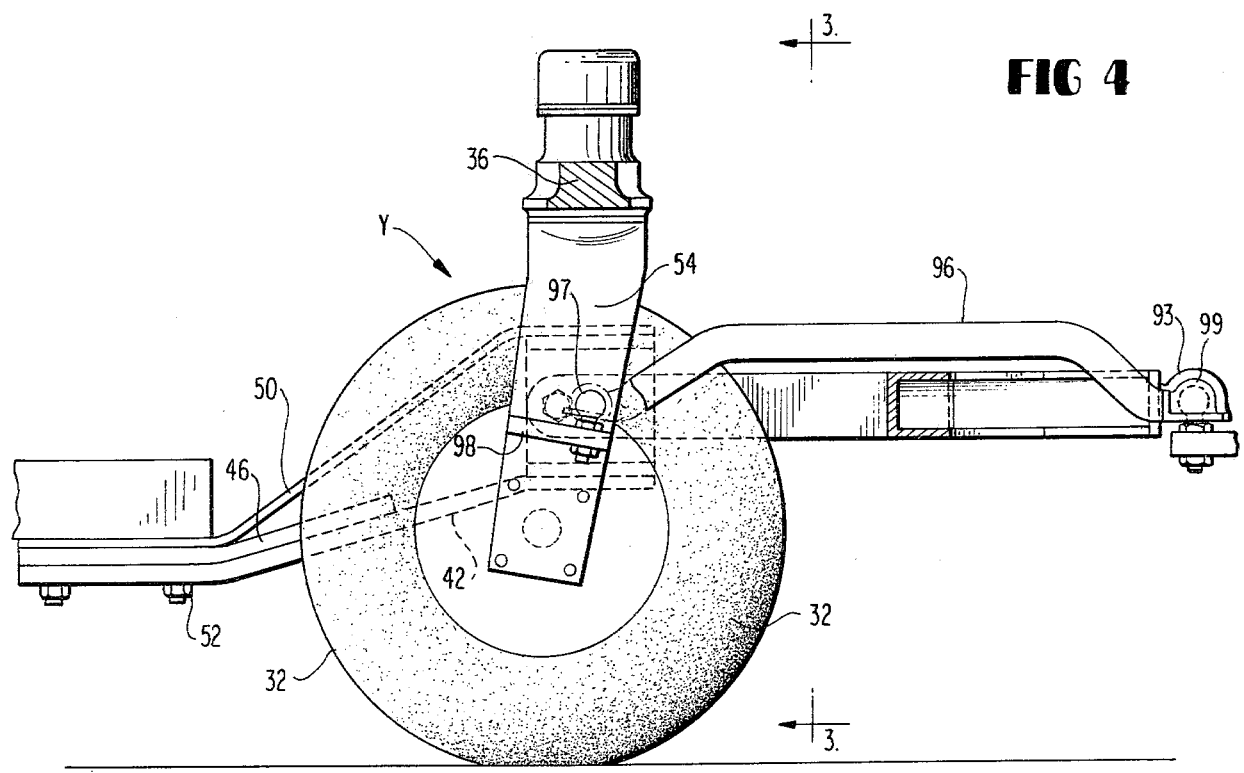
FIG. 4 is an enlarged cross-sectional view thereof taken generally about on line 4—4 in FIG. 3.

The forward end of the tongue 88 on drawbar 84 is provided with a conventional inverted cup-shaped hitch 93 for coupling with a ball 94 of the conventional hitch portion carried by the towing vehicle. As illustrated in FIG. 4, the drawbar is preferably formed of channel-shaped members similarly as frame 12. Thus, it will be appreciated that the drawbar is rigid in the lateral direction but is pivotal about pins 92 in the vertical direction. With all of the weight of the trailer forward of its center of gravity carried by the forward wheel, which is mounted for castering and steering movement as described below, the hitch is free to move vertically whereby transmission of vertical loads from the trailer to the towing vehicle is prevented.

Means are provided for steering the front wheel 32 of the trailer in accordance with the turning movement of the towing vehicle. That is, the trailer is steerable from the towing vehicle in a manner to cause the front wheel 32 to track the turning movement of the towing vehicle. The steering means includes a steering link 96 preferably formed to a shallow inverted shape. The opposite ends of steering link 96 have pivotal connections 97 and 99 respectively. Pivotal connection 97 couples the rearward end of steering arm 98 and front wheel fork 54 one to the other. Pivotal connection 99 couples the forward end of steering link 96 and bracket 100 carried by the rear end of the towing vehicle one to the other. Each pivotal connection 97 and 99 is preferably a universal connection and may be comprised of a conventional ball and socket joint. As illustrated, steering arm 98 projects laterally to the outer side of fork 54. Bracket 100 on the towing vehicle is preferably the same bracket which carries the ball portion 94 for the main hitch which hitches the trailer to the towing vehicle.

By connecting the steering link 96 from fork 58 to a position approximately adjacent the main hitch, the front wheel 32 can be steered by proportioning the linkages so that its turning radius passes through the same point as that of the turning radius of the towing vehicle. That is, by proportioning the length of the steering link and the two radii, steerable front wheel 32 can be made to follow a given towing vehicle with the same accuracy as the suspension and the steering system of the towing vehicle. Lateral loads are therefore supported by the steerable wheel on the trailer within the limits of the flexibility of the tires of the towing vehicle and the steerable front wheel 32.

In a preferred embodiment of the present invention for a towing vehicle having a 100 inch wheel base, a 40 inch overhang from the rear wheels to the hitch, a 6 inch offset from the hitch to the pivotal connection between steering link 96 and bracket 100 and a turning radius of 100 feet and a trailer having a 24 inch overhang between the horizontal axis of the front wheel and the main hitch and a wheelbase of 109 inches, the radius from the vertical steering axis to the pivotal connection between the steering link and steer arm is 9.56 inches. For these dimensions, a steering link having a length of 24.27 inches is provided.

It will be appreciated from a review of FIG. 4 that the pivotal connection constituting the main hitch to the towing vehicle and the horizontal pivotal axis of the drawbar at pins 92 defines a plane. From that same review, it will be seen that the pivotal connections at the opposite ends of steering link 96 also lie in the same plane and that these pivotal connections will lie in the same plane for all variations in the angularity of the drawbar relative to the towing vehicle and trailer. Thus, changes in this angularity will not result in change of steering direction of the front wheel 32. That is, the steering control is independent of any difference in elevation between the horizontal pivotal axis of the drawbar through pins 92 and a parallel horizontal axis through the main hitch constituted by the cup 93 and ball 94.

Turning now to FIG. 7, there is illustrated an attachment to the previously described system which provides a hitch down loading to afford additional traction. To accomplish this, a strut 120 is connected between the top of yoke Y and the hitch. Strut 120 includes a structural tube 122 pivotally connected at 124 to Yoke Y. Tube 122 is open at its opposite end to telescopically receive a rod 126. A helical coil spring 128 surrounds rod 126 and is coupled at its upper end to the base of tube 122. The opposite end of the spring 128 is secured to the rod 126 at 130. The distal end of the rod 126 is pivotally coupled to the hitch. The rod 126 and tube are thus loaded by spring 128 to load the towing vehicle if greater traction is desired.

It will be apparent to those skilled in the art that various modifications could be made in the self-supporting trailer system hereof without departing from the spirit or scope of this invention.

What is claimed is:

1. A self-supporting trailer system for coupling at its forward end to a towing vehicle comprising:
   an elongated frame,
   at least a pair of wheels carried by said frame,
   a yoke connected to said frame at its forward end and having a pair of arms,
   a front wheel,
   means connecting said front wheel and said yoke one to the other for pivotal movement of said front wheel about a substantially vertical axis extending substantially medially between the outer ends of said yoke arms,
   means for steering said front wheel in accordance with the turning movement of the towing vehicle including a steering link having pivotal connections at its opposite ends for pivotally connecting said connecting means and said steering link on the one hand and said steering link and the towing vehicle on the other hand,
   a hitch assembly including a bifurcated drawbar having a tongue at its forward end and a pair of laterally spaced arms extending rearwardly from said tongue, means carried by said tongue adjacent its forward end for releasably coupling said trailer to the towing vehicle, and means for pivotally coupling each of the drawbar arms and a corresponding yoke arm one to the other for relative pivotal movement about a generally horizontal axis,
   the pivotal connections carried by said tongue and the coupling means between said drawbar arms and said yoke arms defining a plane, the pivotal connections carried by said steering link constituting universal joints lying in said plane whereby the steering link connections are maintained in said plane throughout the range of relative pivotal movement between said drawbar and said yoke.

2. A trailer system according to claim 1 including means mounting said front wheel for rotation about a generally horizontal axis spaced rearwardly of said vertical axis whereby said front wheel is casterable.

3. A trailer system according to claim 2 including a pair of leaf springs connecting between said yoke and said frame enabling vertical movement of said frame relative to said yoke and preventing pivotal movement of said yoke about a vertical axis relative to said frame.

4. A trailer system according to claim 2 including a generally longitudinally extending leaf spring connecting each of said yoke arms and said frame one to the other, the connection between said yoke arms and the forward ends of said springs being located below said horizontal pivotal axis, a second pair of generally longitudinally extending leaf springs connecting each of said yoke arms and said frame one to the other, the connection between said yoke arms and the forward ends of said second pair of springs being located above said horizontal pivotal axis, whereby said yoke is stabilized against movement in forward and rearward directions and in a torsional direction.

5. A trailer system according to claim 4 including means carried by said yoke arms for limiting the range of pivotal movement of said drawbar about said horizontal axis.

6. A trailer system according to claim 1 including a pair of springs connecting said yoke and said frame one to the other enabling vertical movement of said frame relative to said yoke.

7. A trailer system according to claim 6 wherein said springs comprise leaf springs coupled between said yoke and said frame for preventing pivotal movement of said yoke about a vertical axis relative to said frame.

8. A trailer system according to claim 1 including means mounting said front wheel for rotation about a generally horizontal axis spaced rearwardly of said vertical axis whereby said front wheel is casterable, and means carried by said yoke for damping oscillations caused by shimmying of said front wheel when castering.

9. A trailer system according to claim 8 wherein said connecting means includes a fork carrying said front wheel, a shaft carried by said fork, said yoke defining a bore for rotatably receiving said shaft, a pair of bearings carried by said yoke in said bore for taking up axial and radial thrust loadings on said shaft, said damping means including an axially movable friction plate secured to said shaft and springs for biasing said plate into engagement with one of said bearings to load said bearings and damp oscillations of said front wheel relative to said yoke.

10. A trailer system according to claim 1 including means mounting said front wheel for rotation about a generally horizontal axis spaced rearwardly of said vertical axis whereby said front wheel is casterable, and a pair of springs connecting said yoke and said frame one to the other enabling vertical movement of said frame relative to said yoke.

11. A trailer system according to claim 1 including leaf springs coupled between said yoke and said frame for enabling vertical movement of said frame relative to said yoke and preventing pivotal movement of said yoke about a vertical axis relative to said frame, said leaf springs constituting the sole structural connection between said yoke and said frame, and means mounting said front wheel for rotation about a generally horizontal axis spaced rearwardly of said vertical axis whereby said front wheel is casterable.

12. A self-supporting trailer system for coupling at its forward end to a towing vehicle comprising:
an elongated frame,
at least a pair of wheels carried by said frame,
a yoke connected to said frame at its forward end and having a pair of arms,
a front wheel,
means connecting said front wheel and said yoke one to the other for pivotal movement of said front wheel about a substantially vertical axis extending substantially medially between the outer ends of said yoke arms,
a hitch assembly including a bifurcated drawbar having a tongue at its forward end and a pair of laterally spaced arms extending rearwardly from said tongue, means carried by said tongue adjacent its forward end for releasably coupling said trailer to the towing vehicle, and means for pivotally coupling each of the drawbar arms and a corresponding yoke arm one to the other for relative pivotal movement about a generally horizontal axis,
means for steering said front wheel in accordance with the turning movement of the towing vehicle including a steering link having pivotal connections at its opposite ends for pivotally connecting said connecting means and said steering link on the one hand and said steering link and the towing vehicle on the other hand, and a generally longitudinally extending leaf spring connecting each of said yoke arms and said frame one to the other, the connection between said yoke arms and the forward ends of said springs being located below said horizontal pivotal axis, a second pair of generally longitudinally extending leaf springs connecting each of said yoke arms and said frame one to the other, the connection between said yoke arms and the forward ends of said second pair of springs being located above said horizontal pivotal axis, whereby said yoke is stabilized against movement in forward and rearward directions and in a torsional direction.

13. A trailer system according to claim 12 wherein said leaf springs constitute the sole structural connection between said yoke and said frame.

14. A self-supporting trailer system for coupling at its forward end to a towing vehicle comprising:
an elongated frame,
at least a pair of wheels carried by said frame,
a yoke connected to said frame at its forward end and having a pair of arms,
a front wheel,
means connecting said front wheel and said yoke one to the other for pivotal movement of said front wheel about a substantially verticle axis extending substantially medially between the outer end of said yoke arms,
a hitch assembly including a bifurcated drawbar having a tongue at its forward end and a pair of laterally spaced arms extending rearwardly from said tongue, means carried by said tongue adjacent its forward end for releasably coupling said trailer to the towing vehicle, and means for pivotally coupling each of the drawbar arms and a corresponding yoke arm one to the other for relative pivotal movement about a generally horizontal axis,
means carried by said yoke arms for limiting the range of pivotal movement of said drawbar about said horizontal axis, and
means for steering said front wheel in accordance with the turning movement of the towing vehicle including a steering link having pivotal connections at its opposite ends for pivotally connecting said connecting means and said steering link on the one hand and said steering link and the towing vehicle on the other hand.

15. A self-supporting trailer system for coupling with a towing vehicle comprising:
an elongated frame,
a pair of laterally spaced wheels carried by said frame adjacent a rear end thereof and a nose wheel carried by said frame adjacent its front end, each of said wheels being located about said frame to carry a substantially like portion of the weight of said trailer.
a yoke,
means connecting said nose wheel and said yoke one to the other for pivotal movement of said nose wheel about a substantially vertical axis relative to said yoke,
said yoke having a pair of laterally extending arms, a generally longitudinally extending leaf spring connecting each of said yoke arms and said frame one to the other enabling vertical movement of said frame relative to said yoke and preventing pivotal movement of said yoke about a vertical axis relative to said frame,
the connection between said yoke arms and the forward ends of said springs being located below said horizontal pivotal axis, a second pair of generally longitudinally extending leaf springs connecting each of said yoke arms and said frame one to the other, the connection between said yoke arms and the forward ends of said second pair of springs being located above said horizontal pivotal axis, whereby said yoke is stabilized against movement in forward and rearward directions and in a torsional direction, and a hitch assembly for releasably coupling said trailer to the towing vehicle including a drawbar connected at one end to said yoke for pivotal movement about a generally horizontal axis, and coupling means adjacent the opposite end of the drawbar and forwardly of said frame for releasably coupling said trailer and the towing vehicle, whereby vertical loading of the towing vehicle from the trailer, when the trailer is coupled to the towing vehicle, is substantially eliminated.

16. A trailer system according to claim 15 wherein said leaf springs constitute the sole structural connection between said yoke and said frame.

17. A trailer system according to claim 16 including means carried by said yoke arms for limiting the range of pivotal movement of said drawbar about said horizontal axis.

18. A self-supporting trailer system for coupling with a towing vehicle comprising:

an elongated frame, a pair of laterally spaced wheels carried by said frame adjacent a rear end thereof and a nose wheel carried by said frame adjacent its front end, each of said wheels being located about said frame to carry a substantially like portion of the weight of said trailer, a yoke, means connecting said nose wheel and said yoke one to the other for pivotal movement of said nose wheel about a substantially vertical axis relative to said yoke, means mounting said nose wheel for rotation about a generally horizontal axis spaced rearwardly of said vertical axis whereby said front wheel is casterable, and means carried by said yoke for damping oscillations caused by shimmying of said front wheel when castering, said connecting means including a fork carrying said front wheel, a shaft carried by said fork, said yoke defining a bore for rotatably received said shaft, a pair of bearings carried by said yoke in said bore for taking up axial and radial trhust loadings on said shaft, said damping means including an axially movable friction plate secured to said shaft and springs for biasing said plate into engagement with one of said bearings to load said bearings and damp oscillations of said front wheel relative to said yoke, means connecting said yoke and said frame one to the other enabling vertical movement of said frame relative to said yoke and preventing pivotal movement of said yoke about a vertical axis relative to said frame, and a hitch assembly for releasably coupling said trailer to the towing vehicle including a drawbar connected at one end to said yoke for pivotal movement about a generally horizontal axis, and coupling means adjacent the opposite end of the drawbar and forwardly of said frame for releasably coupling said trailer and the towing vehicle, whereby vertical loading of the towing vehicle from the trailer, when the trailer is coupled to the towing vehicle, is substantially eliminated.

* * * * *